United States Patent
Barbarie

(10) Patent No.: US 6,877,693 B1
(45) Date of Patent: Apr. 12, 2005

(54) AEROSTAT FOR TRANSPORTING EQUIPMENT AND PASSENGERS

(75) Inventor: Yves Barbarie, 29 bd de Montmorency, Paris (FR), 75016

(73) Assignee: Yves Barbarie, Paris (FR)

( * ) Notice: Subject to any disclaimer, the term of this patent is extended or adjusted under 35 U.S.C. 154(b) by 0 days.

(21) Appl. No.: 09/507,700

(22) Filed: Feb. 22, 2000

(30) Foreign Application Priority Data

Jun. 23, 1998 (FR) .............................. 98 07922

(51) Int. Cl.⁷ ................................................ B64B 1/26
(52) U.S. Cl. ............................. 244/29; 244/30; 244/96; 244/121; 244/125; 244/128
(58) Field of Search ..................... 244/24–30, 96–99, 244/124–128, 121

(56) References Cited

U.S. PATENT DOCUMENTS

| | | | | |
|---|---|---|---|---|
| 1,270,945 A | * | 7/1918 | Hawrylasz | 244/30 |
| 1,270,971 A | * | 7/1918 | Richmond | 244/26 |
| 1,290,979 A | * | 1/1919 | Griffith | 244/97 |
| 1,390,745 A | * | 9/1921 | Armstrong | 244/30 |
| 1,766,358 A | * | 6/1930 | Rose | 244/29 |
| 1,826,076 A | * | 10/1931 | Shephard | 244/25 |
| 2,094,619 A | * | 7/1937 | Reichert et al. | 244/97 |
| 2,428,656 A | * | 10/1947 | Elliott et al. | 244/97 |
| 4,934,631 A | * | 6/1990 | Birbas | 244/30 |
| 5,019,443 A | * | 5/1991 | Hall | 428/215 |
| 6,311,925 B1 | * | 11/2001 | Rist | 244/30 |
| 6,527,223 B1 | * | 3/2003 | Mondale | 244/30 |

* cited by examiner

*Primary Examiner*—Galen Barefoot

(57) ABSTRACT

The invention concerns a lighter-than-air craft for transporting by air equipment and passengers, more particularly, it concerns an aircraft whereof the frame (1) made of light metal and erected vertically, contains and protects the passenger compartment (4) of the invention, and all the components of the invention which, by a mass-reducing assembly (2-8-9-11-19), uses light gas power for neutralizing the earth's gravitational pull. Electric motors actuating propellers (6–7) with multiple blades and powered by a mini-electric power unit (5) enable to counter the force of mean winds, so to lift the neutralized mass and control the aircraft movements. The aircraft wide external surfaces (11–12) are used as wing system, a sailboat keel being replaced by a gyroscope (10) stabilizing effect and by the thrust of the lateral propellers (6). The invention which concerns a novel, safe, silent and economical form of air travel is designed for limited passenger and goods transport, for tourist sightseeing, exploring, observing and multimedia advertising display.

12 Claims, 11 Drawing Sheets

32
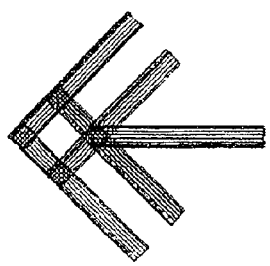
knit
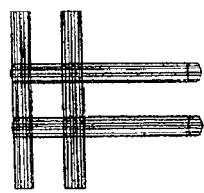
côté
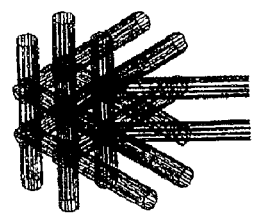
3-D
fig. 8
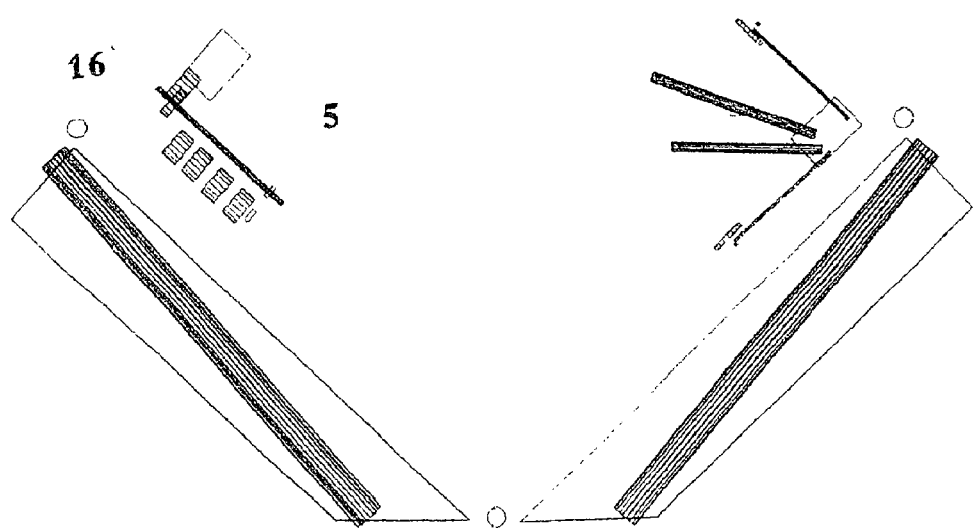
fig. 9

AEROSTAT FOR TRANSPORTING EQUIPMENT AND PASSENGERS

FIELD OF INVENTION

This invention is of the aeronautic category and more particularly of the lighter-than-air craft for commercial and leisure transport.

BACKGROUND OF INVENTION AND BRIEF DESCRIPTION OF PRIOR ART

The types of air crafts which presently exist and use not wings for lift but the neutralization of masses to fly, experience notorious disadvantages.

The air balloon besides its need of a gigantic envelope to retain the volumes of heated air, offer very little security for the passengers. To the fragility of the equipment and the complexity of the preparation preliminaries previous to the flight, are added the instability and precarity of the basket at the mercy of winds on becoming airborne as well as on landing. Moreso, the gas burners, represent a constant danger and especially on emergency landing.

The zeppelin even though offering minimal controls on unwindy days due to the presence of proellents, besides being very vulnerable in the air due to its surface exposed to the slightest breeze, features a titanic size which makes it an airship requiring very large spaces on the ground. At bay, it has the additional inconvenient of being constantly held by cables and retained on the landing sight during embarking proceedures by an inverted push of its propulsion motors it mass having been reduced in function of its total capacity of levitation.

The types of crafts described above offer little security, are cumbersomeby their hypersized dimensions, have very restrictive maneuverability, and require elaborated flight preparations often done in inadapted conditions. Finally, their confort is questionable, and their passenger compartment elementary if not vulnerable.

These crafts also carry high fuel bills linked to the type of petrol and motor propusion used.

The principal object of the present invention, from the different characteristics that make it particular, is to reduce if not eliminate these inconveniences.

BRIEF DESCRIPTION OF THE PRESENT INVENTION

The craft which is the invention concerns a metal structure of a light and solid alloy that produces a framework (1)— FIGS. 2 and 4—built on the vertical and of a size many times reduced if compared to the dimension of the actual lighter-than-air crafts. This framework encloses all the components of the invention of which the passengers and pilot compartment (4)—FIGS. 4 and 5—the securized platform (27) and bullet proof windows (28)—FIG. 5—, hermetically sealed and solidly fitted to the base of the framework; a mass reduction system, comprising compressor (8)—FIG. 6—, interior balloons (2)—FIG. 6—, exterior balloons—FIG. 5—(11) and a tank for lightly pressurized gas like helium (9)—FIGS. 6 and 10b—to neutralize completely or in part the total weight of the craft; a stabilizer (10)—FIGS. 2, 10b and 12—activated on request to eliminate uncomfortable rolls and sways; a multidirectionnal propulsion system (6-7) (18-17)—FIG. 7—powered by electricity; to lift and move the craft once the mass is neutralized; a mini-power station for generating electricity (5) consisting of a small gas engine (30), and a series of generators composed of alternators, coils and transformers (31)—FIGS. 7, 9 and 10b—to produce and provide the energy required to work the electric motors turning propellers (6-7); manual and automatic pilot instruments installed in the cabin (4)-FIGS. 4 and 5—for controlling the craft in the air.

In flight, the craft which is the invention is quiet, uses little fuel, takes off, lands and moves using screw propellents (6-7) fixed to the framework (1)—FIGS. 2 and 4—and which the pilot can control individually from buttons and levers on a control panel in the cabin (4)—FIGS. 4 and 5 —, the craft can by thrust of its lateral propellents (6)—FIG. 7—face medium winds, move with medium winds and land in relatively confined spaces. The framework (1)—FIGS. 2 and 4—behind which are found installed as a whole the components of our invention is protected from shocks and damages by a thick envelope made of balloons molded to the exterior profile of the framework and filled with a lighter-than-air gas such as helium (11)—FIGS. 5 and 10a—covered with a light resistant fabric (12)—FIG. 10a—embodying the balloons—FIGS. 5 and 10a—protecting them from small projectiles. This double envelope (11 and 12)—FIGS. 5 and 10a, by the flat surface it exposes in the air depending on wind direction acts as sails in the manner of sailboats but which in this instance, the pilot exploits in conjunction with the calculated thrust of the propellents (6-7)—FIG. 7—to maneuver the craft towards its destination.

In the case of a fast lost of altitude, a parachute (14)—FIG. 10a—located on top of the craft, helps, in conjunction with the propellents (6-7)—FIG. 7)—, to master the course of the craft to insure a safe landing.

According to Production Particulars:

1) The framework can be supported on the ground by levelling pegs or stand on directional suspension wheels (20). Retractable air balloons (15)—FIG. 5—can be placed under the craft to allow landing on water.

2) The framework can be built of metal sheetings and/or with L or T or tubular beams made of light metal alloy set on a geometrical layout and vertical and transversal complementary beams and cross-over shanks (33)—FIG. 4—can be added to give lightness, rigidity and form to the structure.

3) Male or female type structural connecting corners (32)—FIGS. 2, 9 and 12—can become components substitutes to a monocoque type structure with multiples weilding points to facilitate assembly and repair of the structure as a whole.

4) The craft can take a spherical, conical, cubical shape, etc. in accordance with contraints imposed by the gas volumes required to lift the craft.

5) The framework of our invention (1)—FIGS. 2 and 4—of an extended cubical shape erected vertically allows a much reduced ground surface contact. Viewed from above, the extremities can form a square (1)—FIG. 10a—or a diamond pattern (1)—FIG. 10c—or any other type of polygonal pattern. The framework can, by its configuration, display at the rear a round shape (1)—FIG. 10d—, the large surface so exposed allowing it, when partly-opened, to become a sail for fair winds like a spinnaker on sailboats.

6) The protective envelope (12)—FIGS. 5 and 10a—can shield separately or be part of the molded balloons (11)—FIGS. 5 and 10a—fitted on the exterior of the framework.

7) The <<weight reduction>>system manually or automatically controlled can consist of many gas-receptor balloons, and several compressors for lighter-than-air gas such as helium (8)—FIG. 10b—, all used to neutralize rapidly the combined mass of the craft which is the invention, the material placed on board and the passengers.

8) The balloons positioned inside and outside the framework can be attached to the framework to be lifted by cablings such as the type used on air balloons or by hooks integrated into the structure of the balloons.

9) The small gas engine which is the initial power source of the mini electric power station can be of another type of energy source and activate all suitable types of generators, coils and transformes. The power station can be complemented or replaced by a solar energy system which photoelectric cells could cover the exposed surface of the craft.

BRIEF DESCRIPTION OF THE DRAWINGS

FIG. 8 represents the structural connecting corner, viewed from above, viewed from the side and viewed in perspective.

FIG. 9 represents viewed from above, the propulsion system, the mini electric power station, and, the compressor and its umbilical extensions.

DETAILED DESCRIPTION OF PREFFERRED EMBODIMENTS

Figure 1:
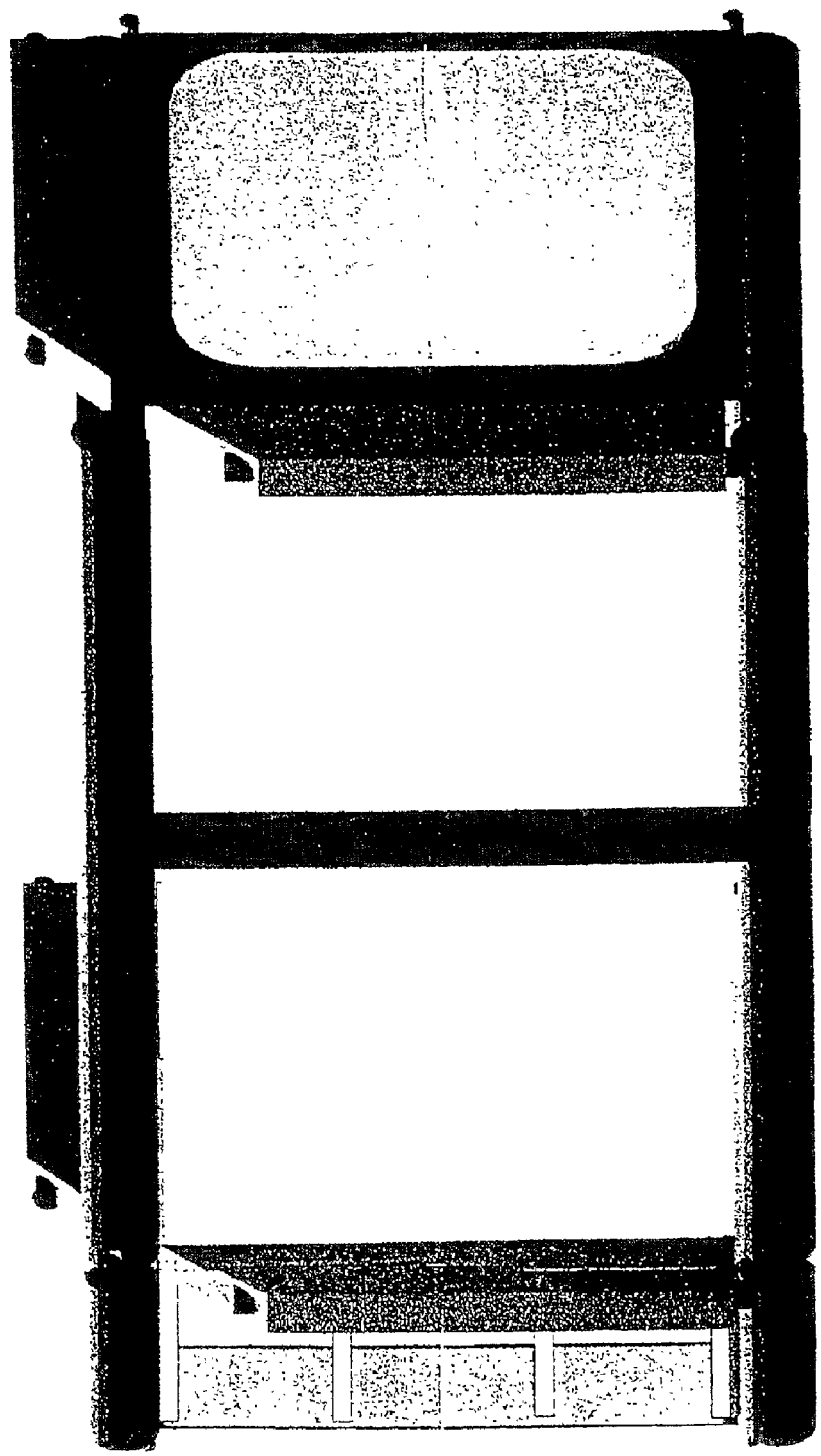
FIG. 1 is a perspective view showing an embodiment of the present invention.
Figure 2:
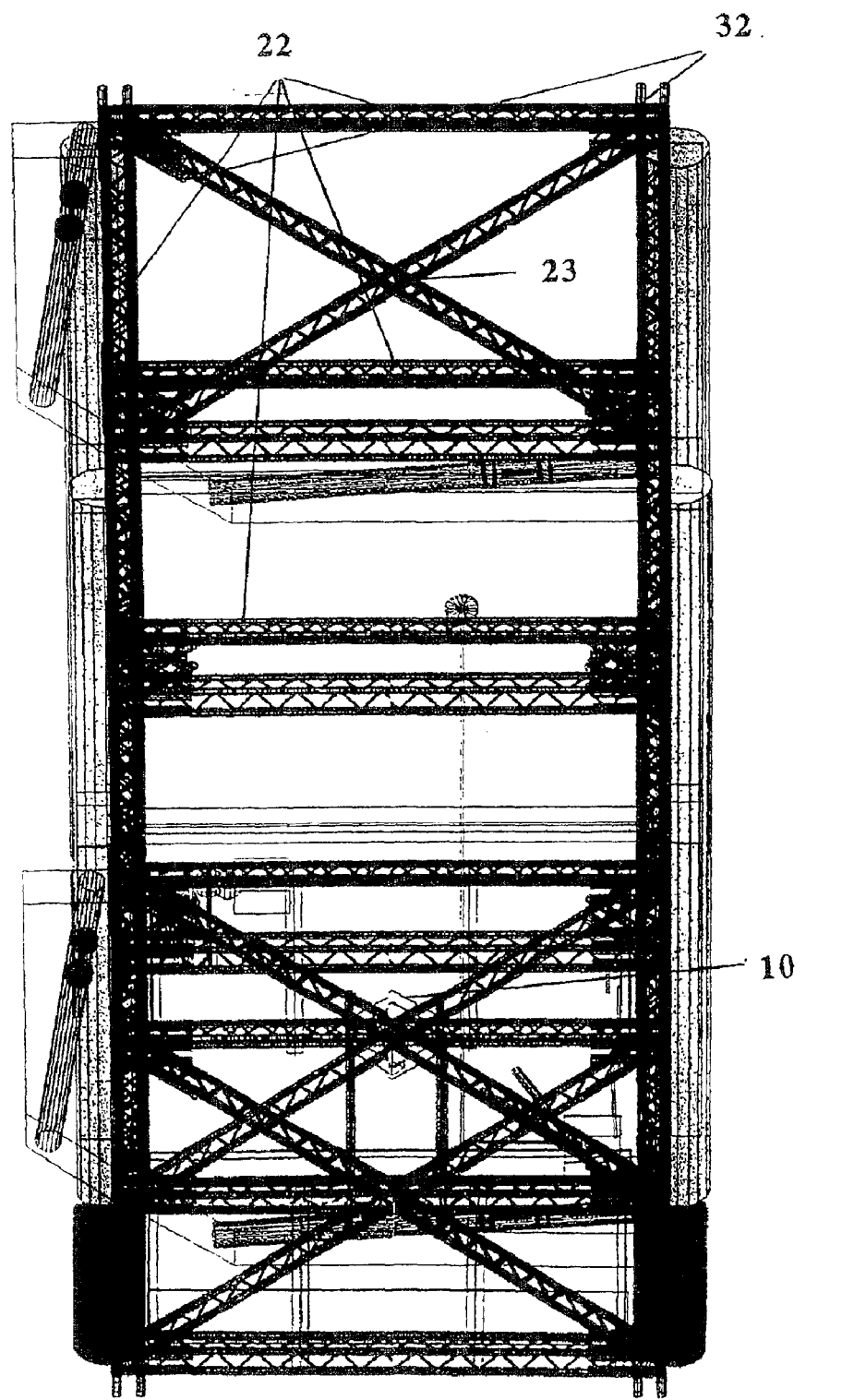
FIG. 2 is a perspective view showing the framework of the present invention and its structural components.
Figure 3:
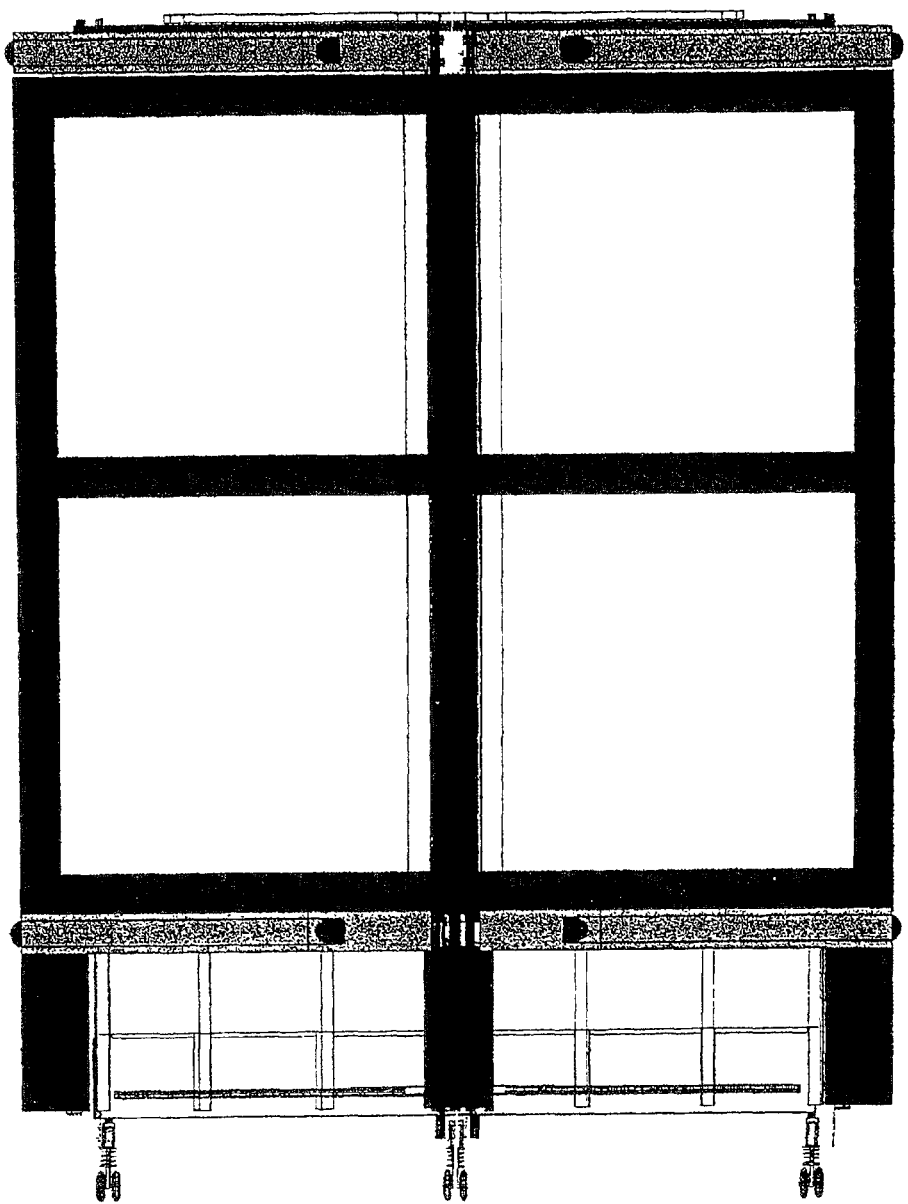
FIG. 3 is a front view of the craft shown in FIG. 1.
Figure 4:
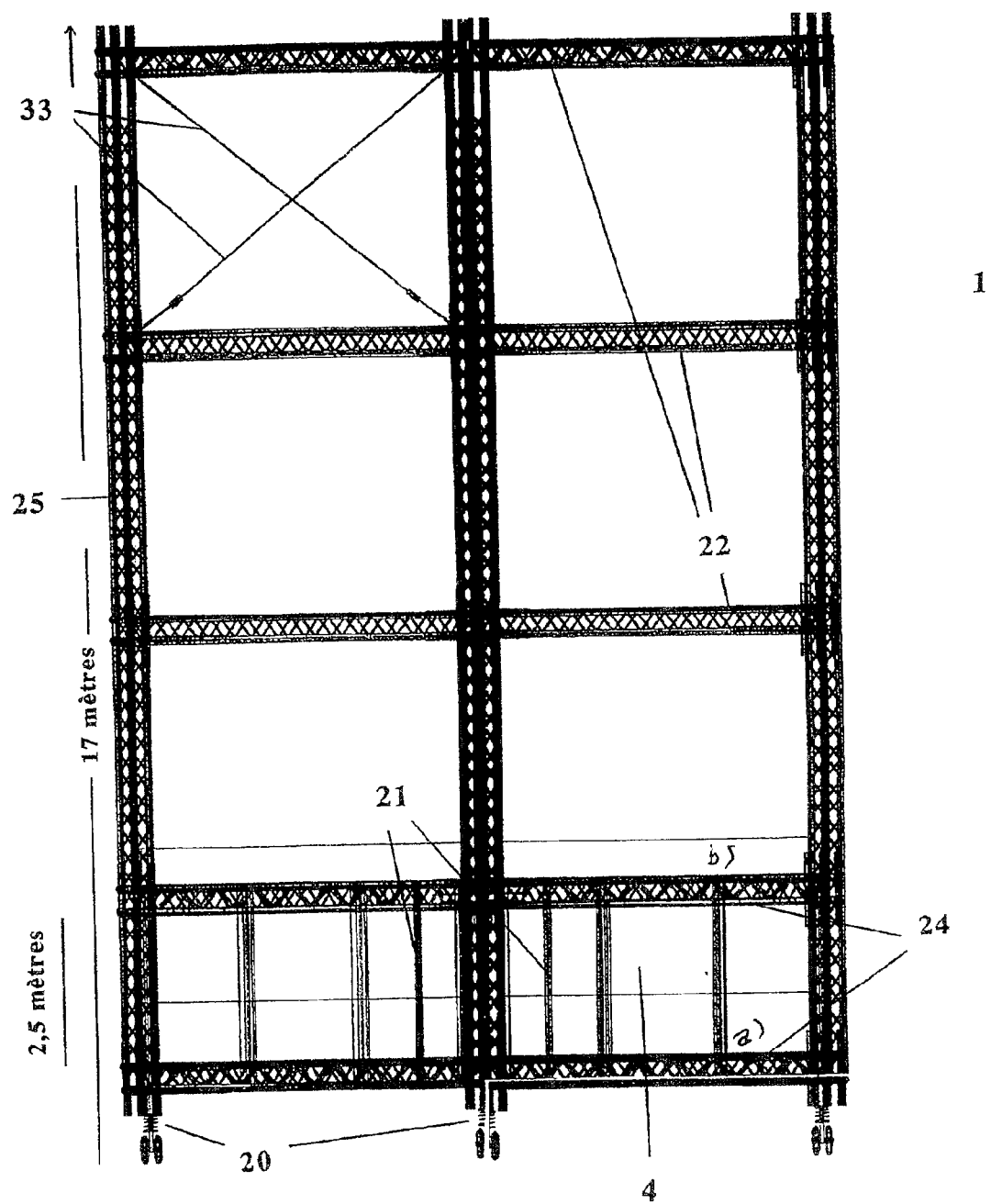
FIG. 4 is a front view of the framework of the present invention.
Figures 11, 12:
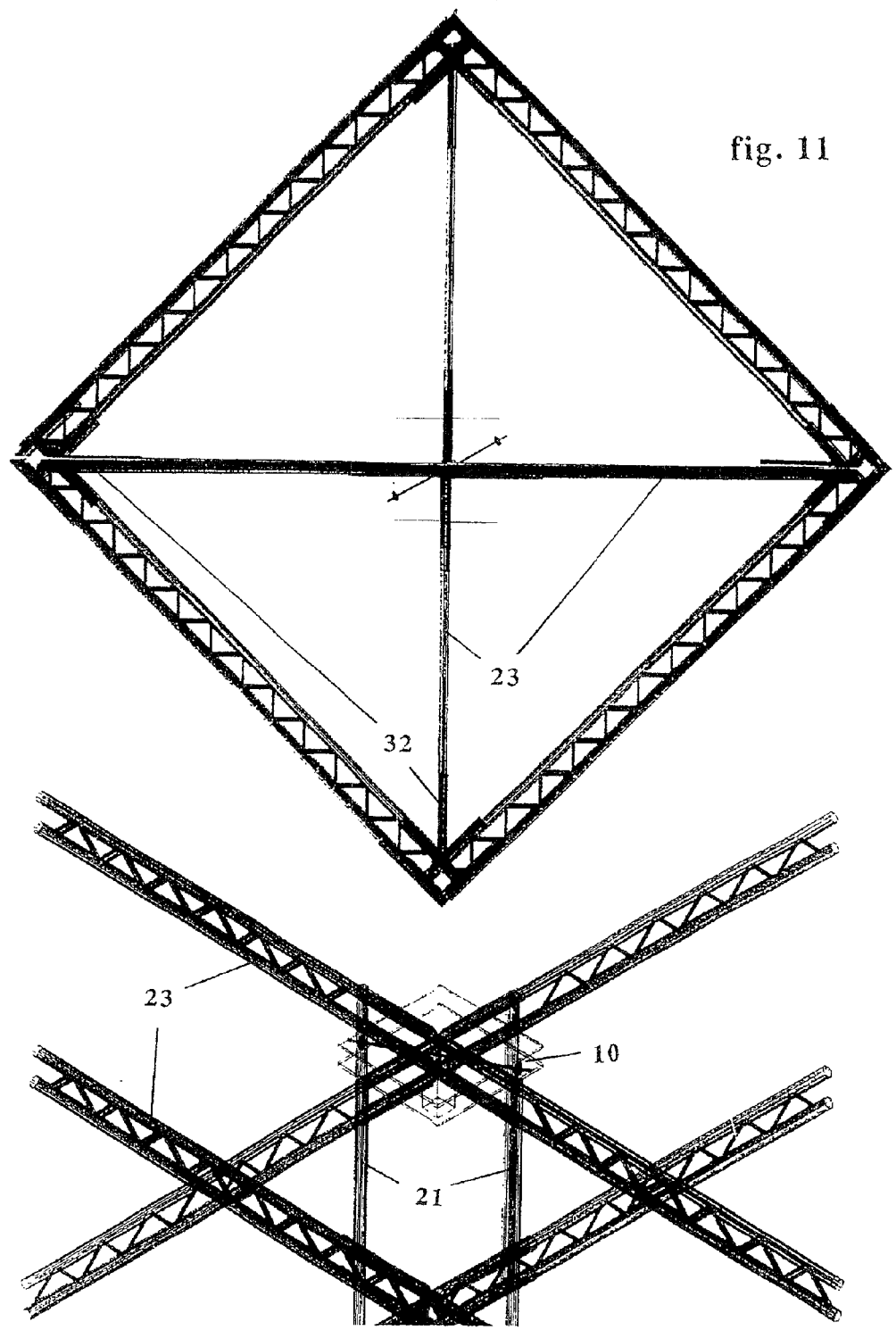
FIG. 11 represents, in overdimension, the composition of the framework of the present invention seen from above and illustrates the function of the connecting corner units in the building of the general structure.
FIG. 12 represents, in overdimensioned perspective, the stabilizer placed inside the diagonal cross-sections under the machine compartment and the 4 retaining beams placed in the center of the cabin to reinforce the overall structure of the passenger compartment.
Figure 13:
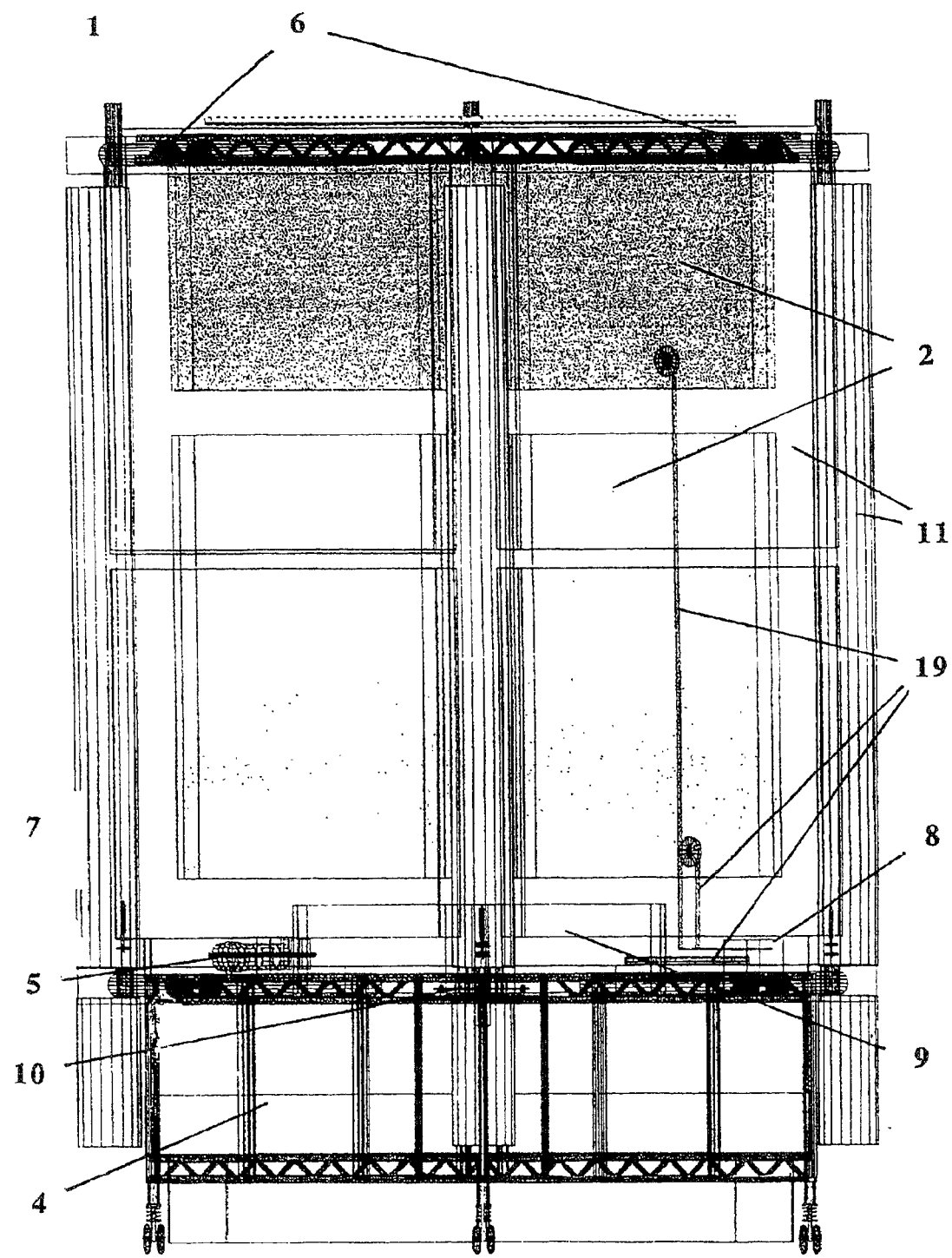
FIG. 13 shows a frontal view of the craft.

Erected on the vertical, the framework (1)—FIGS. 2 and 4—of the craft of an extended cubical shape resembling a tower is made of pylons (25)—FIG. 4—of about 17 meters high of a geometrical architecture reinforced and retained starting from the base, by supporting beams (21)—FIG. 4—, of horizontal cross-overs (22)—FIGS. 4 and 12—and of landings made of successive X shaped cross sections (24)—FIG. 4—all united by the structural connecting corners (32)—FIGS. 2, 9 and 12.

The diagonal cross sections (23)—FIGS. 2, 11 and 12—arranged at equal distance in the framework (1)—FIGS. 2 and 4—apply a transversal resistance and support the platform of the passenger compartment (24a)—FIG. 4—and that of the machine compartment (24b)—FIG. 4—. The horizontal cross-overs (22)—FIGS. 4 and 12—strengthen the position of the vertical pylons (25)—FIG. 4—and provide the retaining points for anchors (26)—FIG. 6—of cables and hooks (3) FIG. 6—for the interior and exterior sustentation balloons (5–11)—FIGS. 6 and 5—.

The male or female structural connection corners (32)—FIGS. 2, 9 and 12—link up the horizontal cross-overs (22)—FIGS. 4 and 2 —, the diagonal cross sections (22)—FIGS. 2 and 11—and the vertical pylons (25)—FIG. 4 which are solidly screwed and riveted to facilitate assembling, dismantling and repairing of the general structure.

Figure 5:
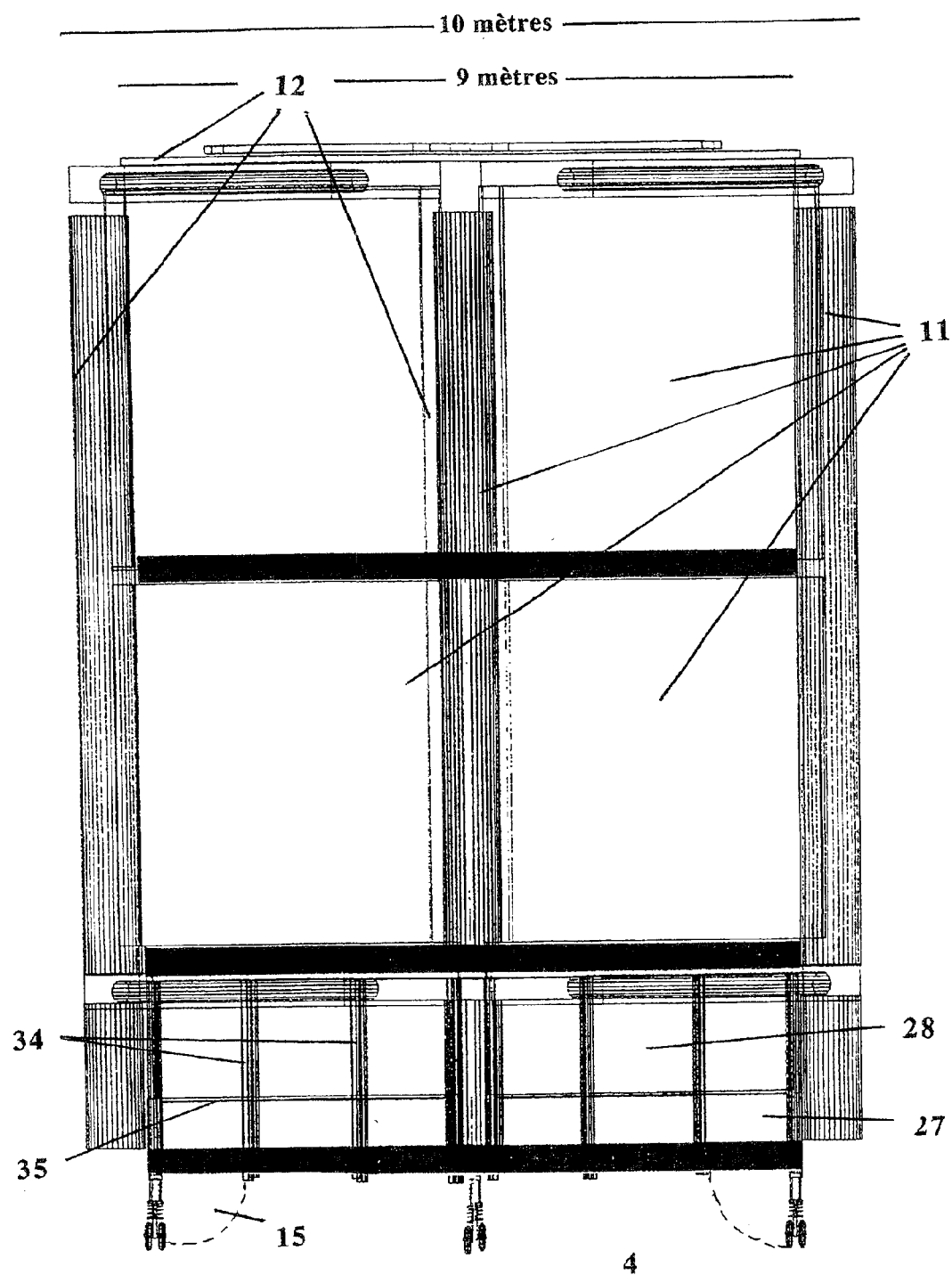
FIG. 5 is a front view of the molded exterior balloons of the present invention.

The framework (1)—FIGS. 2 and 4—which shelters all the components of the invention and protects them from outside obstacles, is covered by a light but thick protective envelope composed of balloons (11)—FIG. 5—permanently inflated with a lighter-than-air gas such as helium and molded to the exterior shape of the framework (1) these being covered totally or in part by a fabric resistant to small projectiles and riping; in exception of the passenger compartment (4) and windows already benefiting a protection.

The overall structure stands on a shock absorbing support on wheels (20)—FIG. 4—for ground movement with option of inflatable balloons (15)—FIG. 5—placed behind the wheels emplacement for sea landing.

The passenger compartment (4)—FIGS. 4 and 5—is built in the base of the framework (1). Supports made of vertical beams (21)—FIG. 4—hold firm both the floor and the ceiling (24) FIG.—4—and are positioned at the center of the cabin, fixed at the meeting point of the diagonal cross sections of the inferior and superior platforms of the cabin (4). The inferior part of the lateral walls (27)—FIG. 5—is solidly attached to the inferior horizontal cross-overs and firmly contained from the exterior by supporting beams (34) FIG. 5—fixed to the horizontal inferior and superior crossover beams surrounding the cabin. The superior lateral wall (28)—FIG. 5—built-in a groove in the superior part of the inferior wall (27)—FIG. 5—of the cabin (4) consists of bullet-proof see-through panels (28)—FIG. 5—allowing both a clear view to the passengers and a protection against small projectiles. Two openings (29)—FIG. 10a—with securing locks situated at the rear of the cabin (4) allow embarkment and evacuation of occupants.

Figure 10:
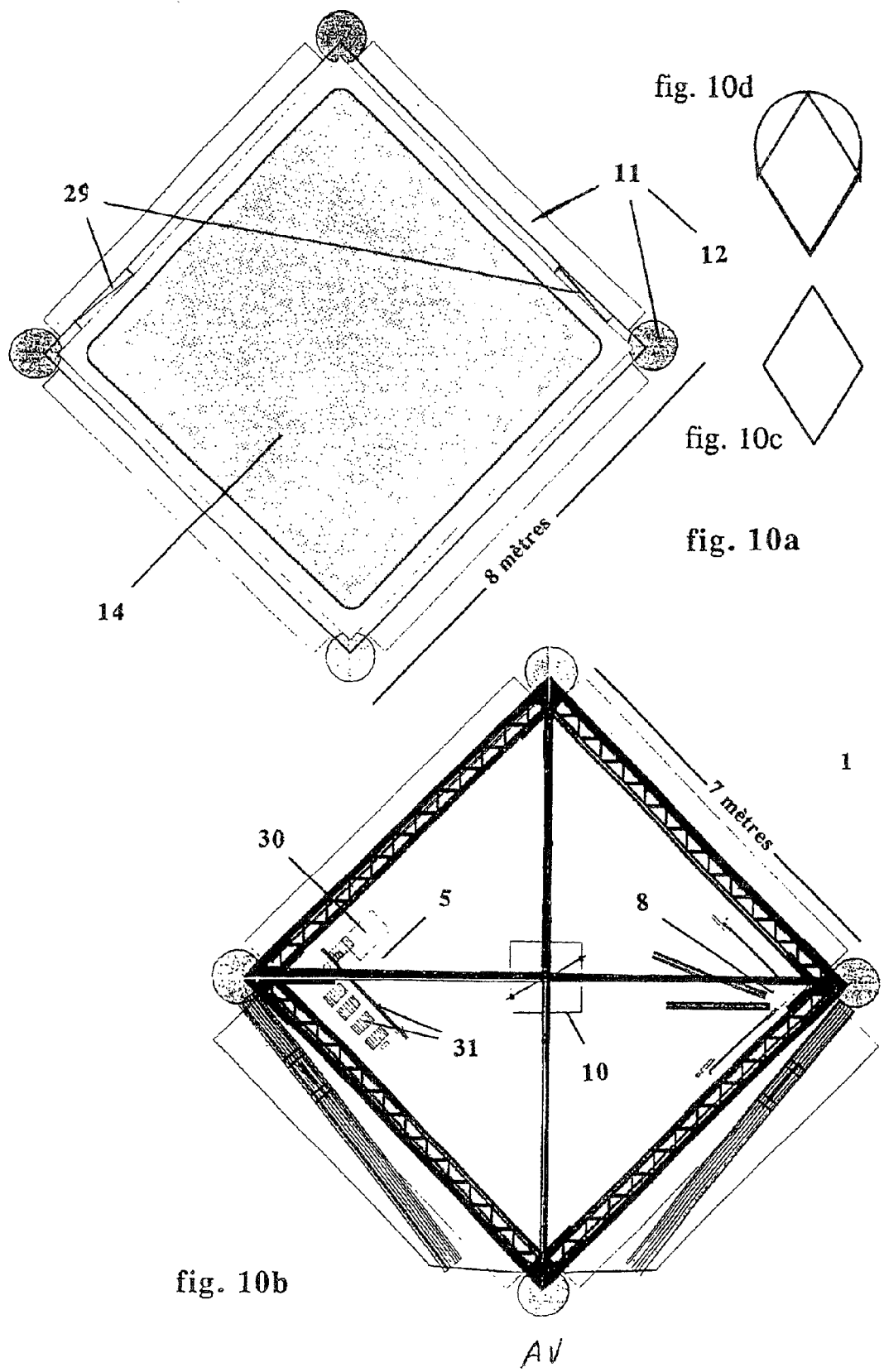
FIG. 10 represents the present invention viewed from above with, in contrast, the molded exterior balloons and the emergency parachute in the center (a); the present invention viewed from above with, in contrast, the framework configurations, the positioning of the horizontal tubular passages and the emplacement of the stabilizer, the electric power station and the compressor (10 b), the present invention which structure seen from above, takes the form of a diamond (10 c) and the present invention which structure seen from above, takes the form of a diamond and so, on the fore part and of a half circle on the back part (10 d).

The balloons inflated with alighter-than-air gas such as helium and molded (11)—FIGS. 5 and 10a—to the exterior configuration of the framework (1)—FIGS. 2 and 4—contribute to lighten the mass and protect the craft and its load.

The cover resistant but light (12)—FIGS. 5 and 10a—wraps the craft for total protection of the inflated surfaces and of the on-board equipments without covering the cabin space (4)—FIGS. 4 and 5—already secured. This cover also serve as a sail to exploit fair and adverse winds.

Figure 6:
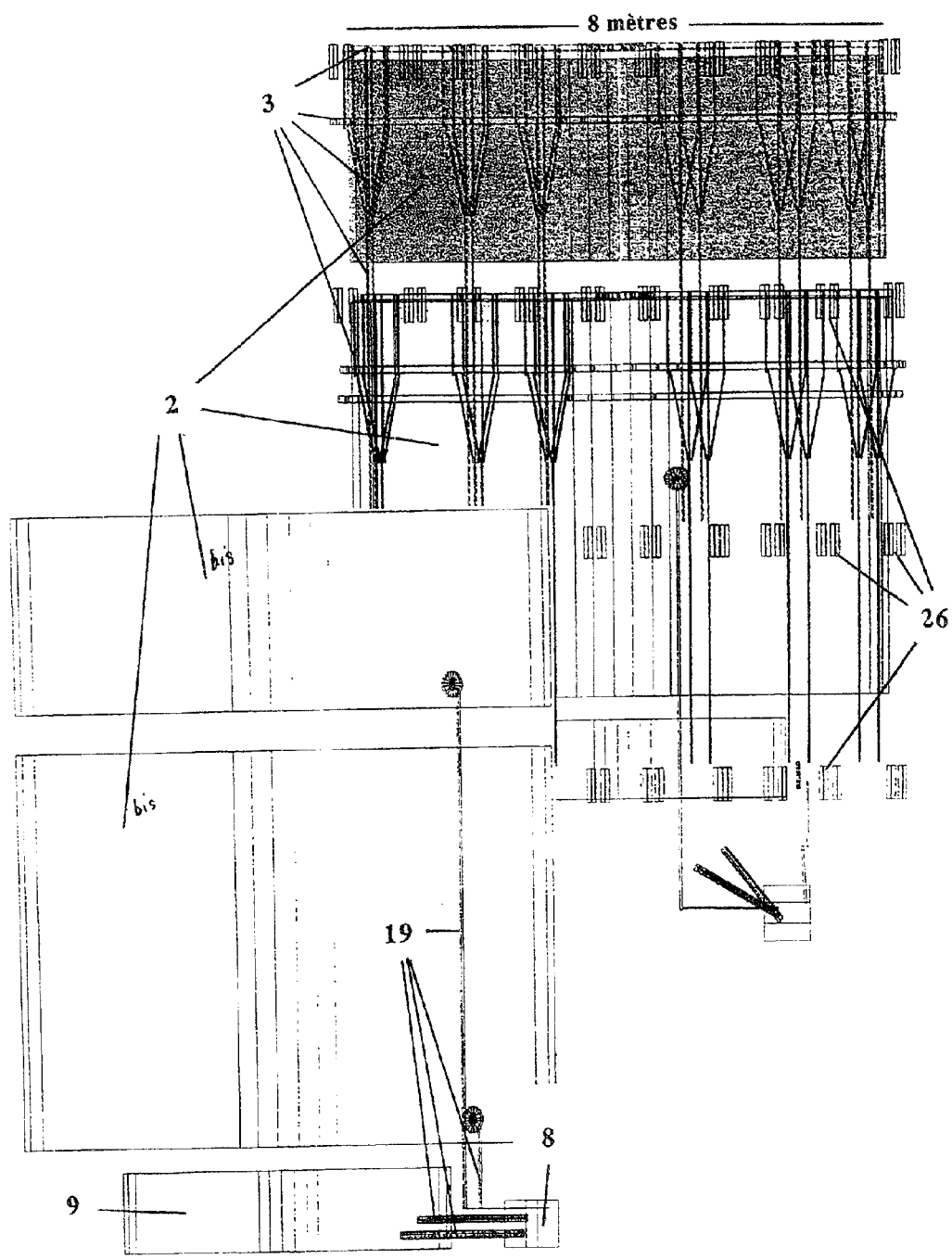
FIG. 6 represents the weight reduction system which comprises the interior balloons, the cabling (and the hooks fixed to the horizontal cross-overs), the tank containing low pressurized gas such as helium and the compressor linked to the different components of the system by umbilical tubes.

The weight reduction system (2-8-9-11) consists of balloons (1)—FIG. 6—inflatable with lighter-than-air gas such as helium, of a diameter equal to the dimension of the interior walls of the framework and more or less equal to the volume of the unoccupied space of the framework and retained by a system of cables (3)—FIG. 6—hooked to the framework (1)—FIGS. 2 and 4—which they allow to lift; and, of balloons which thickness is equal to a meter or more (11)—FIGS. 5 and 10a—inflated with lighter-than-air gas such as helium and molded according to the exterior configuration of the framework which adds to the variable capacity of gas retention of the interior balloons (2)—FIG. 6—to lighten the overall craft.

The umbilical tubes (19)—FIG. 6—of the compressor system (8)—FIGS. 6 and 10b—are fitted to the balloons (2)—FIG. 6—enclosed behind the framework (1)—FIGS. 2 and 4—and to the pressurized tank (9)—FIG. 6—set on the machine platform (24b)—FIG. 4—.

in accordance to the mass to neutralize, the compressor system through these tubes (8)—FIGS. 6 and 10b—on request from the manual or automatic pilot control, injects in the interior balloons (2)—FIG. 6—a definite quantity of the gas stored in the pressurized tank (9)—FIG. 6—.

By an inverted process, in accordance with the partial mass of the craft to recover, the compressor system (8)—FIGS. 6 and 10b—using the manual or automatic pilot control, extracts a specific quantity of gas from the interior balloons, (2)—FIG. 6—and recompresses the volume of gas extracted to store it in the lightly pressurized tank (9)—FIG. 6—.

Figure 7:
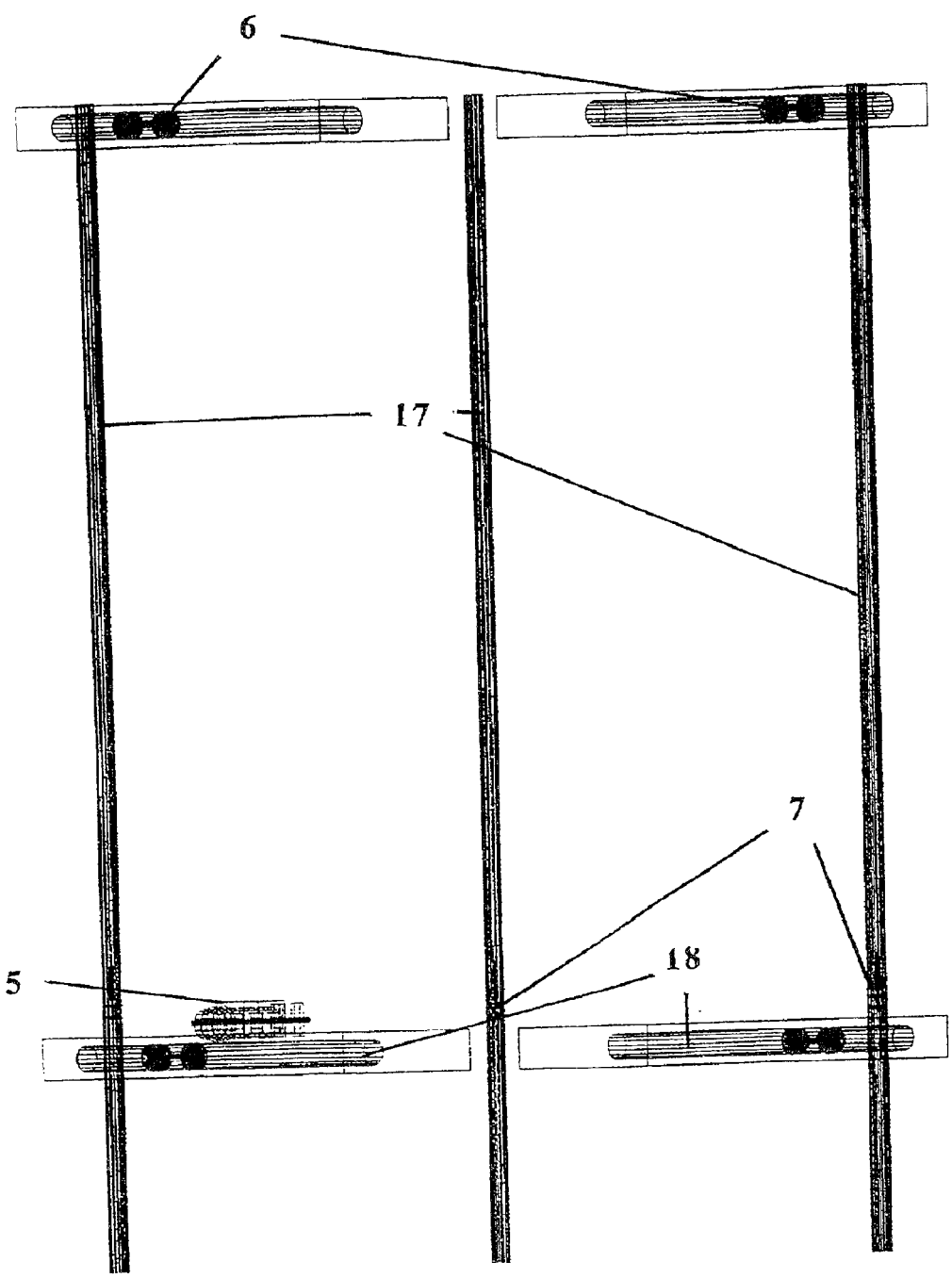
FIG. 7 is a front view of the propulsion system comprising the horizontal tubular passages inside which are placed the lateral thrust motors, the vertical tubular passages inside which are placed the vertical thrust motors and the mini electric power station.

The electricity generating system (5)—FIGS. 7, 9 and 10b—consists of a small liquid fuel engine (30)—FIG. 10b—producing the basic source of energy and a gearing system which links the main motor shaft to a secundary shaft which in turn activates a seies of alternators (31)—FIG. 10b—linked to one or more modules of coils and transformers that produces the energy required by the propellents 6–7)—FIG. 7—and the other electric accessories of the craft.

Coupled electric motors (7)—FIG. 7—with a power rating around 3500 to 4000 t/mn adapted to the conditions of lightness and miniaturization of the craft, drive multiblade propellers about 50 centimeters in diameter. They are fitted inside long tubular passages erected vertically on the craft and of a diameter a few millimiters larger than that of the propeller (17)—FIG. 7 and positioned inside and along the total length of the vertical pylons (25)—FIG. 4—of the framework (1), to obtain from the pilot control, a concentrated air thrust directed above or below allowing the craft in doing so to gain or lose altitude.

Coupled electric motors (7)—FIG. 7—with a power rating around 3500 to 4000 t/mn adapted to the conditions of lightness and miniaturization of the craft, drive multiblade propellers about 50 centimeters in diameter. They are fitted inside long tubular passages set horizontally on the craft and of a diameter a few millimiters larger than that of the propeller and fitted at the horizontal and more or less equal to the length of a horizontal cross-overs beam (22)—FIG. 4—and positioned along the top and along the bottom level of the frontal surface of the craft to obtain from the pilot control, a concentrated air thrust directed towards the front or the rear, from the left or from the right to move the craft which is the invention backward, forward, to the right or to the left.

A gyrospcope (10)—FIGS. 2, 10b and 12—activated by a variable speed electric motor placed between the ceiling of the passenger compartment (4)—FIGS. 4 and 5—and the floor 24b)—FIGS. 2 and 4—of the machine compartment and is used to eliminate the rolls and sways of the craft. Depending on the type of flying the pilot chooses to execute to control the craft, the system can be desactivated or reactivated on command. In combination with the propellers, (6–7)—FIG. 7—it is also used to counter winds when the craft, temporarily immobilized, is not held to the ground by other means.

Once the weight of the craft is neutralized by the mass reduction system—FIG. 6—, the manual or automatic pilot starts the propellents (6) positioned vertically on the craft to take off and then the propellents (7) positioned horizontally to set the direction—FIG. 7—. The movement of the craft in the air, on water and on the ground is done by varying the thrust of the motors individually or together.

The maneuvers are done similar to a sailboat confronted to adverse and fair winds that is, by zigzaging towards its destination and exposing the sail surface (11)—FIG. 5 —in an angle favorable to the bearing of winds. The pilot ajusts the thrust of the horizontal propellers according to winds in presence and the course to hold.

How the Invention Works

At rest, the grounded craft, for safety measures, is held firm by retractable metallic wires fitted on the four corners of the framework and on hooks well anchored on the track, or, is sheltered in a hangar that can have lateral doors to receive and allow the craft to move in and on option, an open roof allowing direct take off and landing in fair weather.

The port-of-call or the landing location may consist of a system of tall palisades or wind breakers singled out or arranged in a star-shape formation behind which the craft which is the invention can land and take off.

At rest, the interior balloons connected to the compressor are partially empty. The craft has then, part of its mass restored and can move on the ground without difficulty.

After favorable outing permission granted, take-off preparations require positive verification of the running conditions of the manual and and automatic piloti system and of the quantity of gas required to undertake the prospected flight. The pilot is imperatively required to know the weight of the occupants and/or of the material the craft will have to transport.

Once these informations are known and considered favorably, the pilot starts the engine of the mini electric power station and activates the compressor. The compressor then injects the lighter-than-air gas such as helium sufficient to neutralize both the weight of the craft and the total weight of the passengers to embark (max. 4–8 according to the individual weight of the passengers).

The passagers are accepted on board. The task of the weight reduction system almost completed, the vertical motors are started exerting a calculated thrust toward the sky which holds the craft on the ground awaiting the imminent total neutralization of the mass. The pilot then relaxes the motors in the vertical air ducts set in inverted thrust (diagonal selection) and gradually increases the thrust towards the ground of the two other vertically set motors while reducing to zero the inverted thrust of the motors in the first two vertical ducts.

This maneuver then allows the craft to execute a vertical take off, the horizontal motors are then started and their thrust are used to direct the craft on the desired trajectory. The thrust of the motors placed vertically is reduced once the proper altitude is reached. If the thrust of all motors is reduced to zero, the craft remains suspended in the air carried in the direction of the winds in presence.

The pilot defines the bearing to hold and after having established the direction of the winds, positions the craft so that the surface of certain walls of the craft can use the winds to its advantage.

The thrust of the lateral motors is then calculated to both keep bearings and exploit to the most the angle of oncoming winds.

The craft which is the object of our invention then travels through the sky like a sailboat which without losing its bearings in adverse winds, zigzags to proceeds towards its destination.

Once destination is reached, the pilot places the craft face to the wind, increases the thrust of the horizontal motors to immobilize the craft in the air and sets off an upper thrust of the vertical motors to start the landing procedures. A soft landing is executed by gradually reducing the thrust of the vertical motors after being a few meters from the ground while keeping the craft face to the wind and feeping the immobilizing thrust of the horizontal motors which counters the wind resistance.

This maneuver is retained until the mass reduction system has restored the partial mass of the craft, the pilot also having to take in consideration the sudden loss of weight which represents the disembarkation of passengers by temporarily increasing the inverted thrust of the vertical motors.

Its partial mass restored, if the craft remains on the ground for some time and is not in its port-of-call, it can be secured to the ground against the violence of sudden winds with fittings kept on board to be solidly screwed into the ground.

What is claimed is:

1. A craft using lighter-than-air gas to transport by air material and passengers, which comprises
    a framework enclosing in the upper part of its structure, balloons inflated with a lighter-than-air gas and held by cables hooked to the framework which they grip and pull away from the gravitional force;
    a cabin with bulletproof windows for the pilot and passengers set on the base of the framework;
    a mini power station which supplies electricity to the equipments and accessories of the craft;
    propellents placed inside long tubular passages for concentrated air thrust, used to lift the neutralized mass of the craft and to move it in the air space;
    a compressor system which injects in the balloons or retrieves from the balloons a calculated quantity of lighter-than-air gas stored in a slightly pressurized tank according to the total mass of the craft to be neutralized or to partially restore;
    a stabilizer system to eliminate rolls and sways and
    a protection system consisting of balloons inflated with lighter-than-air gas, molded over the total exteror surface of the framework, and, a cover covering all the framework made of a fabric resistant to tears and small projectiles—excluding the passenger compartment.

2. The lighter-than-air craft of claim 1 wherein the framework of the craft represents a rectangular structure or extended cubical erected vertically which extremities seen from above form a square or a diamond pattern and which front of the craft is formed by the meeting point of two of the sides of the framework and the extension of these sides which allow the exterior envelope covering this surface of the framework both to cut facing winds and expose at proper angle said surfaces as sails to oncoming winds.

3. The lighter-than-air craft of claim 1 wherein the framework of the craft consists of and is mounted around male or female connection corners which receive and link the horizontal cross-overs, the diagonal cross sections and the vertical pylons at each level of the framework to be solidly screwed and riveted together to facilitate mounting, dismantling and repair of the overall structure.

4. The lighter-than-air craft of claim 1 wherein said protection system further includes
    a double exterior envelope consisting of said molded balloons, inflated with lighter-than-air gas, covering the exterior surface of the framework in exclusion of the cabin and a fabric resistant to tears and small projectiles covering and protecting all the exterior surfaces of the craft —in exclusion of the cabin.

5. The lighter-than-air craft of claim 1 wherein the exterior envelope covering the exterior molded balloons attached to the framework serves as sail surfaces for the craft to exploit winds.

6. The lighter-than-air craft of claim 1 wherein the mini electric power station has as initial source of energy the drive shaft of a liquid fuel engine geared to a series of alternators which energy production after transformation, supply electricity to the propellents, the compressor system, the stabilizer motor and the other electrically powered accessories of the said craft.

7. The lighter-than-air craft of claim 1 wherein the horizontally oriented propellents and the vertically oriented propellents are powerful electric motors turning multiblade propellers placed inside long tubular passages allowing at the exit a concentrated air thrust.

8. The lighter-than-air craft of claim 1 wherein the vertically oriented propellents(7) inserted in long tubular passages are placed inside each vertical pylons of the framework their exit being close to the base and the top of the framework; and, the horizontally oriented propellents inserted in long tubular passages are positioned at the top of the framework and above the cabin along the left and right frontal surface of the craft.

9. The lighter-than-air craft of claim 1 wherein the stabilizer system is a gyroscope activated by a variable speed electric motor and set on an horizontal plane inside the framework between the machine floor and the ceiling of the cabin to eliminate uncomfortable sways and rolls of the craft and activated or disactivated in relation with the intended pilot maneuvers.

10. The lighter-than-air craft of claim 1, wherein the molded balloons are permanently inflated and fitted to the exterior of the framework and the cover is also exterior to the molded balloons.

11. The lighter-than-air craft of claim 1 wherein the balloons held by a system of cables, fitted to hooks on the horizontal cross-overs of the framework on being filled with a calculated quantity of decompressed lighter-than-air gas are used to reduce gradually the weight of the craft, of the loaded material and of the passengers and neutralize the earth attraction exerted on the craft and its load which can then be lifted in the air with the thrust of the vertical propellents.

12. The lighter-than-air craft of claim 1 wherein the cabin is placed behind the vertical pylons of the framework,
    the cabin platform is set on the horizontal cross-overs and the diagonal cross sections held at the centre by a system of vertical beams supporting both the bottom level of the passenger compartment and the bottom level of the machine compartment of the framework;
    the overall structure is carried by a suspension system on wheels for ground movement and/or by a system of inflatable and retractable balloon-bags for sea landings;
    the windows fitted to the lateral balustrade are bulletproof; and,
    the secured cabin openings, for embarkation and disembarkation of passengers, are positioned at the rear of the cabin.

* * * * *